United States Patent
Song et al.

(10) Patent No.: US 8,611,898 B2
(45) Date of Patent: Dec. 17, 2013

(54) REDUCING A NUMBER OF FLOW REFERENCES IN MESSAGING ASSOCIATED WITH A MULTICAST SESSION IN A WIRELESS COMMUNICATIONS SYSTEM

(75) Inventors: Bongyong Song, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 12/750,236

(22) Filed: Mar. 30, 2010

(65) Prior Publication Data
US 2010/0255839 A1 Oct. 7, 2010

Related U.S. Application Data

(60) Provisional application No. 61/167,437, filed on Apr. 7, 2009.

(51) Int. Cl.
*H04W 36/00* (2009.01)
(52) U.S. Cl.
USPC .......................................... 455/435.1; 370/338
(58) Field of Classification Search
USPC ....................................................... 455/435.1
See application file for complete search history.

(56) References Cited

U.S. PATENT DOCUMENTS

| 2005/0282571 | A1 | 12/2005 | Oprescu-Surcobe et al. |
| 2007/0281722 | A1* | 12/2007 | Gao ............................... 455/518 |
| 2009/0080356 | A1 | 3/2009 | Song et al. |
| 2009/0080361 | A1 | 3/2009 | Song et al. |
| 2009/0080363 | A1 | 3/2009 | Song et al. |
| 2009/0080364 | A1 | 3/2009 | Song et al. |
| 2009/0080373 | A1 | 3/2009 | Song |

FOREIGN PATENT DOCUMENTS

JP 2007531418 A 11/2007

OTHER PUBLICATIONS

International Preliminary Report on Patentability—PCT/US2010/029792, The International Bureau of WIPO—Geneva, Switzerland, Mar. 25, 2011.
International Preliminary Report on Patentability—PCT/US2010/029792, The International Bureau of WIPO—Geneva, Switzerland, May 24, 2011.
International Search Report and Written Opinion—PCT/US2010/029792, International Search Authority—European Patent Office—Nov. 5, 2010.

* cited by examiner

*Primary Examiner* — Marcos Batista
(74) *Attorney, Agent, or Firm* — Raphael Freiwirth

(57) ABSTRACT

An access terminal selects less than all of a plurality of flows associated with a given multicast session, and sends a call registration message including reference to the selected less than all flows to an access network to request registration to each of the plurality of flows. The access network receives the call registration message, and interprets the call registration message as requesting registration to each of the plurality of flows associated with the given multicast session. The access network transmits a scheduling message to a group of access terminals that advertises less than all of a plurality of flows associated with the given multicast session. Access terminals in the group that receive the scheduling message interpret the scheduling message as if each of the plurality of flows is advertised as carried upon a downlink channel.

47 Claims, 8 Drawing Sheets

REDUCING A NUMBER OF FLOW REFERENCES IN MESSAGING ASSOCIATED WITH A MULTICAST SESSION IN A WIRELESS COMMUNICATIONS SYSTEM

CLAIM OF PRIORITY UNDER 35 U.S.C. §119

The present Application for Patent claims priority to Provisional Application No. 61/167,437 entitled "REDUCING A NUMBER OF FLOW REFERENCES IN MESSAGING ASSOCIATED WITH A MULTICAST SESSION IN A WIRELESS COMMUNICATIONS SYSTEM" filed Apr. 7, 2009, and assigned to the assignee hereof and hereby expressly incorporated by reference herein.

BACKGROUND OF THE INVENTION

1. Field of the Invention

Embodiments of the present invention are directed to reducing a number of flow references in messaging associated with a multicast session in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, an access terminal selects less than all of a plurality of flows associated with a given multicast session, and sends a call registration message including reference to the selected less than all flows to an access network to request registration to each of the plurality of flows. The access network receives the call registration message, and interprets the call registration message as requesting registration to each of the plurality of flows associated with the given multicast session. The access network transmits a scheduling message to a group of access terminals that advertises less than all of a plurality of flows associated with the given multicast session. Access terminals in the group that receive the scheduling message interpret the scheduling message as if each of the plurality of flows is advertised as carried upon a downlink channel.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
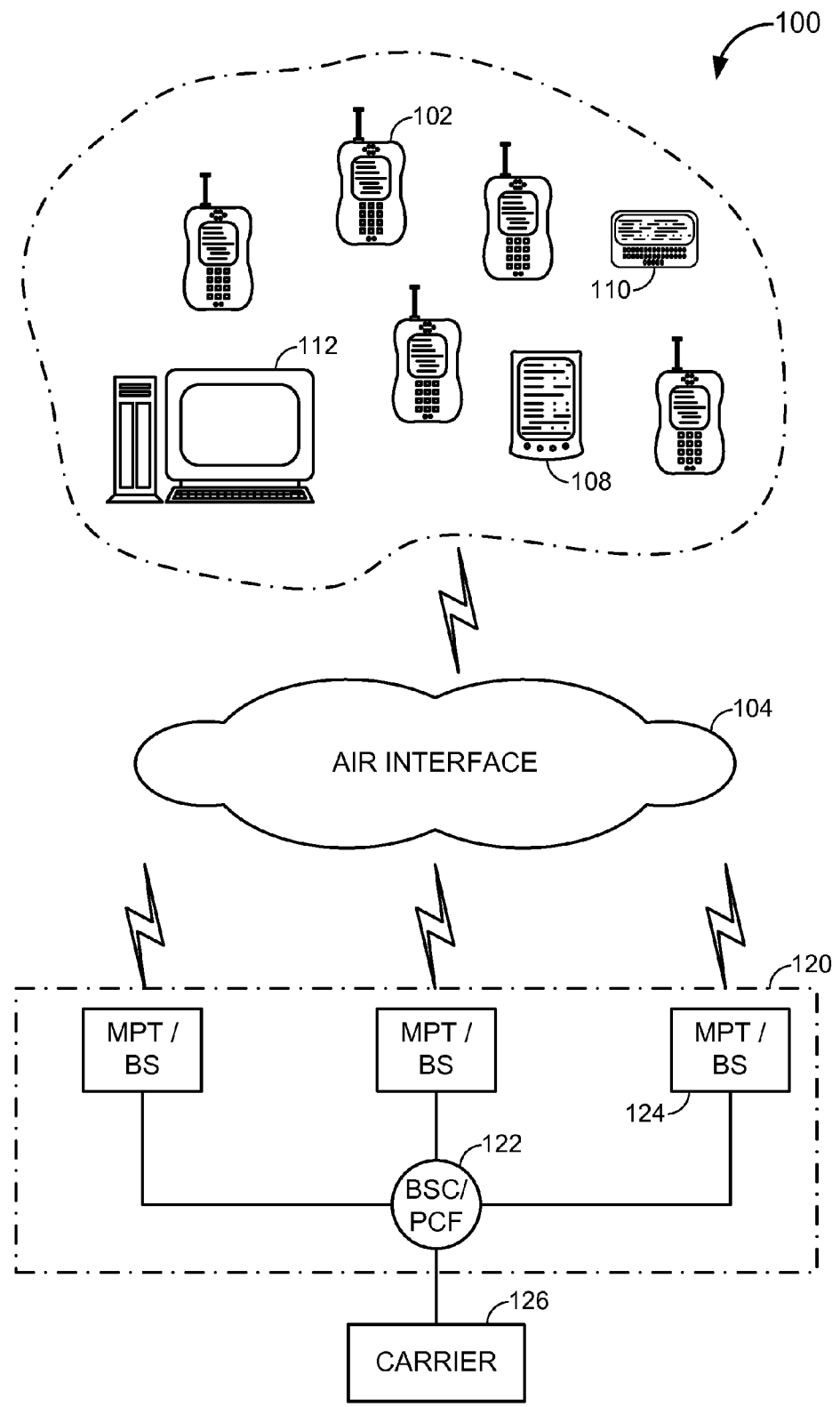
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
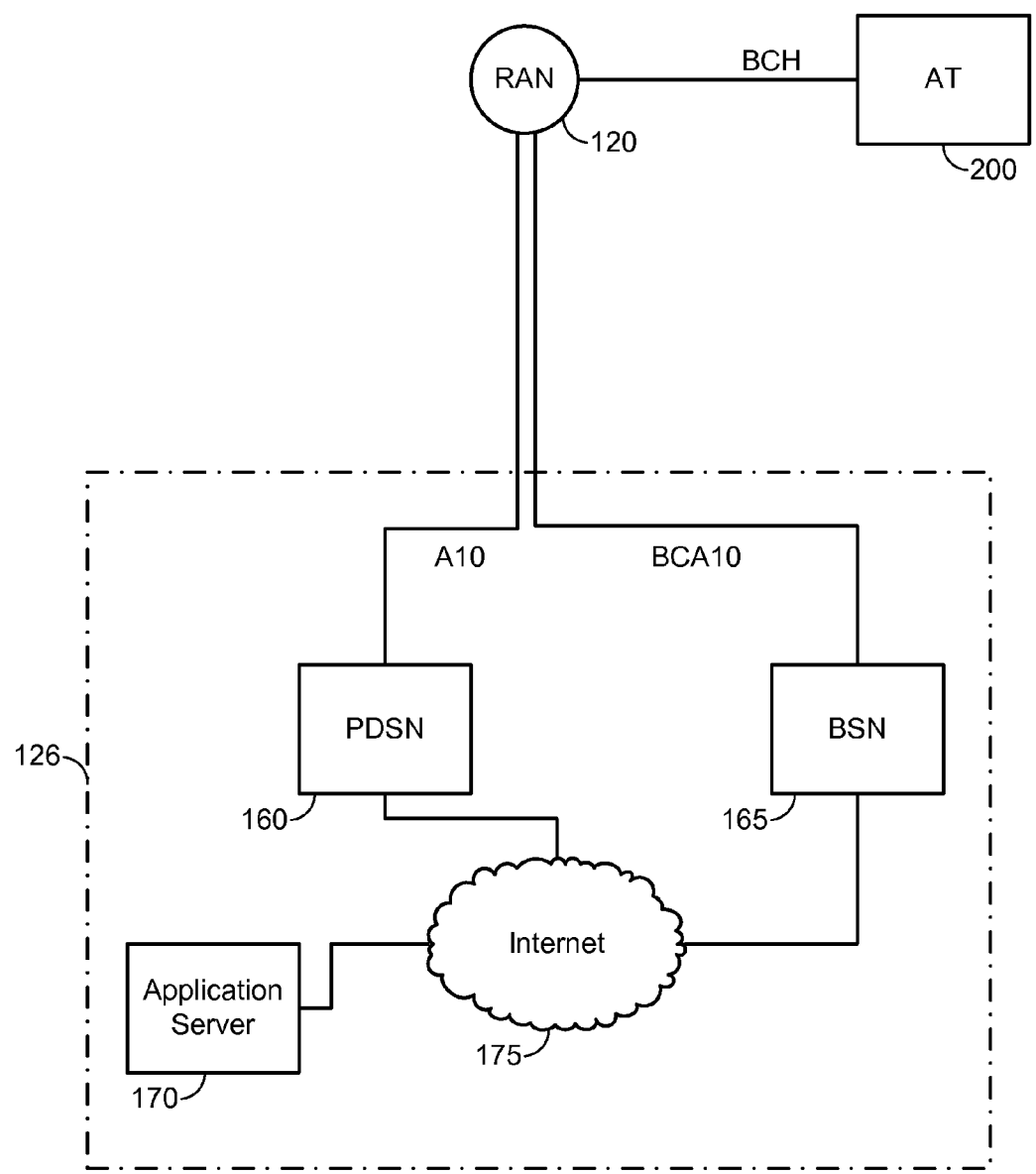
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
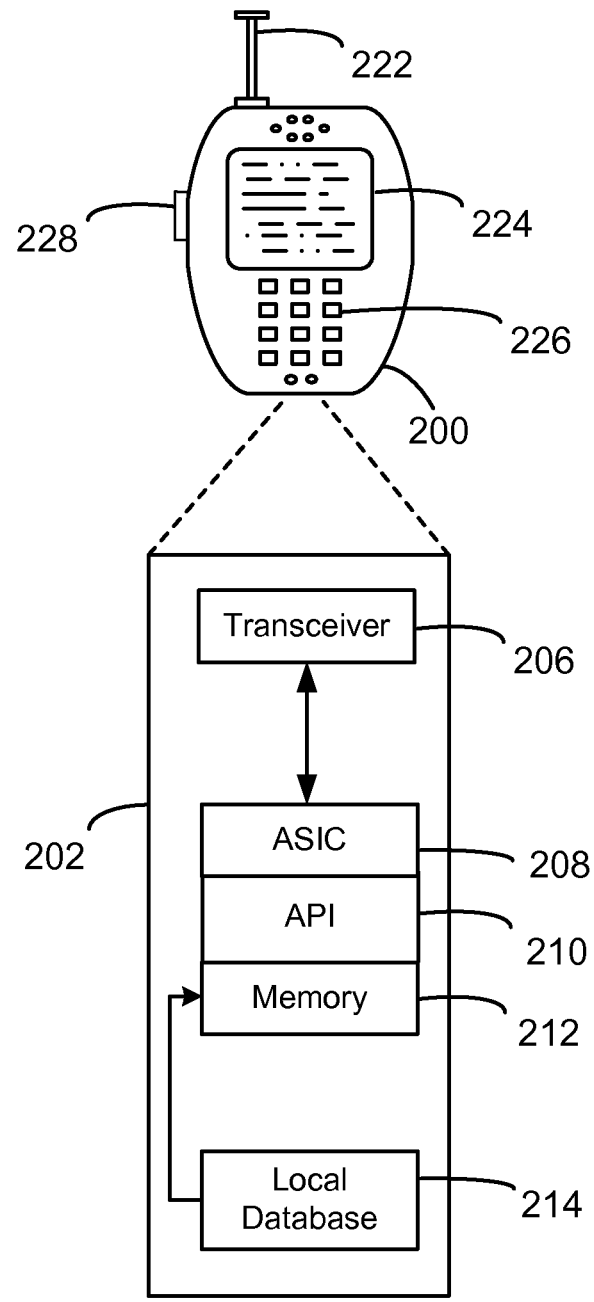
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
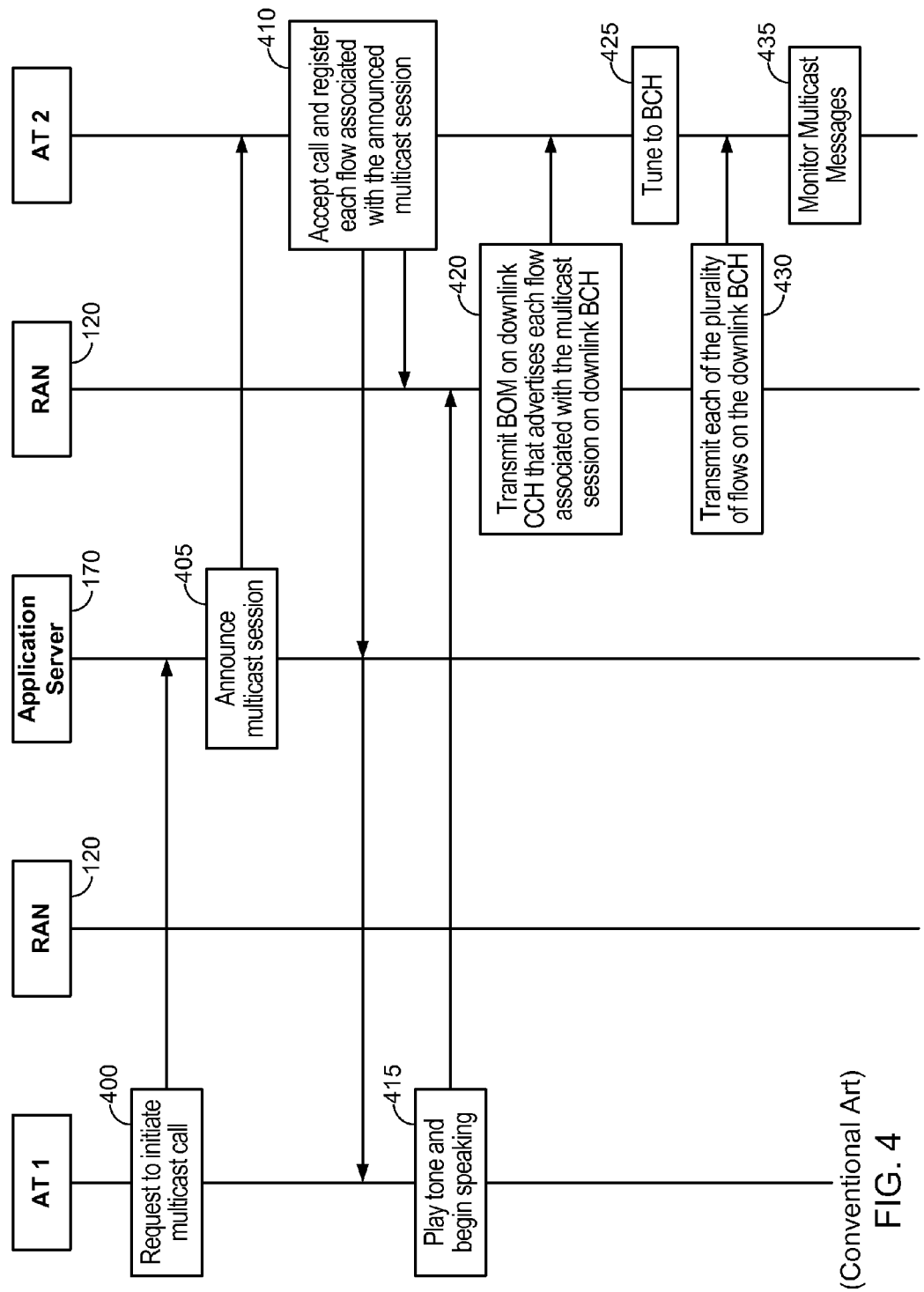
FIG. 4 illustrates a conventional multicast call set-up process.

FIG. 4 illustrates a conventional multicast call set-up process. Referring to FIG. 4, a given AT ("AT 1") sends a message requesting to initiate a multicast call or session, 400. For example, if the multicast call corresponds to a PTT call, the message transmission of 400 can be performed in response to a user of AT 1 pressing a push-to-talk (PTT) button on AT 1. The RAN 120 receives the multicast call request and forwards the multicast call request to the application server 170. The application server 170 receives the multicast call request and generates an announce message for announcing the multicast call or session, 405. The application server 170 forwards the announce message to the RAN 120 for transmission to a plurality of ATs, 405. In FIG. 4, assume that AT 2 belongs to the multicast group of the announced multicast call. Accordingly, in 405, the RAN 120 transmits the announce message at least within AT 2's sector in the wireless communications system 100.

Next, assume that AT 2 receives and decodes the announce message, and determines to accept or join the announced multicast call. Accordingly, AT 2 generates a call acceptance message (e.g., an announce ACK accept message) and a call registration message (e.g., a BCMCSFlowRegistration message), transmits the call acceptance message to the application server 170 via the RAN 120 on a reverse link channel (e.g., a reverse link access channel (R-ACH), a reverse link traffic channel (R-TCH), etc.), and transmits the call registration message to the RAN 120 on the reverse link channel, 410. The call registration message is used to inform the RAN 120 that at least one AT in AT 2's sector is interested in participating in the announced multicast session, such that the RAN 120 knows to transmit a plurality of flows (e.g., one or more media flows, a signaling flow, etc.) associated with the announced multicast session at least within AT 2's sector. For example, if the announce multicast session corresponds to a PTT session, a first BCMCS flow is used for media and a second BCMCS flow is used for signaling. Thus, to ensure that the RAN 120 will carry all flows associated with the PTT session, the call registration message (e.g., the BCMCSFlowRegistration message) transmitted in 410 includes a request to receive both of the first and second BCMCS flows. These two BCMCS flows can share the same IM pair, in an example, but each of the two BCMCS flows would still conventionally be separately advertised in the BOM, as will be discussed below in more detail.

After receiving a first call acceptance message from a first responder to the announce message, the application server 170 sends a message to AT 1 (e.g., the PTT initiator) indicating the multicast session can begin. Accordingly, AT 1 plays a tone to indicate that the user of AT 1 can begin speaking to the multicast group, and AT 1 begins to forward voice data, 415 (e.g., or other types of data, as in a push-to-transfer (PTX) call) to the application server 170, which forwards the voice data to the RAN 120 for transmission at least within AT 2's sector.

At some point after receiving the call registration message from AT 2, the RAN 120 transmits an initial scheduling message, 420, (e.g., a broadcast overhead message (BOM)) on a downlink control channel (CCH) within AT 2's sector that lists or advertises the multicast flows carried in AT 2's sector in association with instructions on how to decode the advertised multicast flows on a downlink broadcast channel (BCH). For example, in a PTT call, the initial scheduling message may correspond to a BOM that advertises the media and signaling flows for the PTT call, with each of the media and signaling flows in the BOM indicating the same interlace-multiplex (IM) pair that carries data associated with the PTT call.

Generally, the downlink CCH is a relatively low-capacity channel whereas the downlink BCH is a relatively high capacity channel. Messages are sent on the downlink CCH when the messages are relatively small and/or when it is particularly important for ATs to decode the messages correctly. It is important for ATs to decode BOMs correctly so that the ATs can determine that a multicast session is being on the downlink BCH in their sector, and also to figure out how to tune to the multicast session on the downlink BCH, in an example. However, each advertised flow within the BOM consumes bandwidth on the downlink CCH, which reduces the number of multicast sessions that can be advertised within a given sector.

Returning to FIG. 4, after decoding the scheduling message (e.g., BOM), AT 2 tunes to the downlink BCH in the manner indicated by the scheduling message for the advertised flows, 425. Because the same downlink BCH resources (e.g., IM pair) is listed for each flow of the multicast session, AT 2 tunes to the indicated downlink BCH resource in 425. Next, the RAN 120 begins transmitting multicast messages forwarded from the application server 170 (e.g., the voice packets uploaded from AT 1) at least in AT 2's sector in the manner indicated by the scheduling message (e.g., on the BOM-indicated IM pair for any of the two PTT flows), 430. Each individual transmission of 430 may correspond to any of the flows associated with the given multicast session on one particular IM pair. Because AT 2 has already tuned to the downlink BCH as indicated by the BOM for the given multicast session, AT 2 monitors and decodes the multicast packets on the downlink BCH, 435.

As discussed above, BOMs, and/or other similar scheduling messages in other protocols, are configured to advertise each flow carried in a particular sector on the downlink BCH. Because the flows associated with a given multicast session do not typically overlap, the same IM pair can be used for multiple flows for the session. Thus, while two or three (e.g., or even more) flows can be advertised in a BOM for the multicast session, each of the flows indicates the same IM pair on the downlink BCH. The advertisement of each flow for the multicast session indicating the same IM pair consumes precious resources on the downlink CCH, as will be discussed below in more detail with respect to FIGS. 7 and 8.

Accordingly, embodiments of the present invention, which will now be described in more detail, are directed to advertising less than all flows (e.g., a single flow) associated with a particular multicast session within a scheduling message (e.g., a BOM) that is transmitted on a downlink channel (e.g., a downlink CCH) in one or more sectors. Thus, in the case where a single flow is advertised, the single flow is representative of each multiple flow associated with a given multicast session, and one or more ATs that wish to participate in the given multicast session interpret the single flow as an indication that all flows are being carried at the indicated portion (e.g., IM pair) of the downlink BCH, such that the omission of one or more flows in the scheduling message need not prompt a call registration message for the 'missing' or omitted flow(s). Thus, a scheduling message in accordance with at least one embodiment of the invention is reduced compared to a conventional scheduling message. Embodiments of the present invention described below are also directed to reducing the number of flows referenced in a call registration message, which, like the scheduling message, may be configured to omit one or more flows while still requesting registration to the omitted flow(s).

Figure 5:
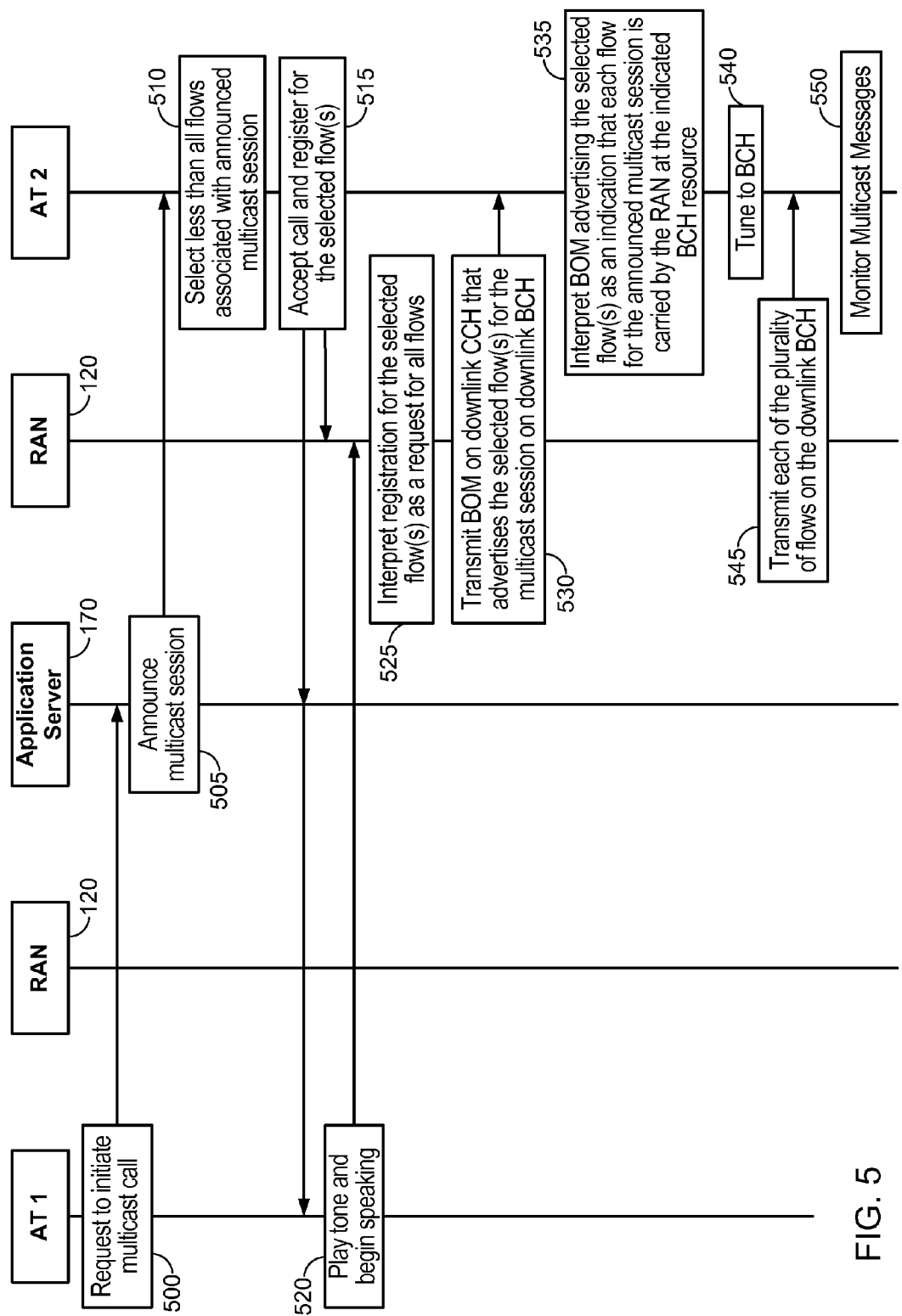
FIG. 5 illustrates a multicast call set-up process according to an embodiment of the invention.

FIG. 5 illustrates a multicast call set-up process according to an embodiment of the invention. Referring to FIG. 5, a given AT ("AT 1") sends a message requesting to initiate a multicast call or session, 500. For example, if the multicast call corresponds to a PTT call, the message transmission of 500 can be performed in response to a user of AT 1 pressing a PTT button on AT 1. The RAN 120 receives the multicast call request and forwards the multicast call request to the application server 170. The application server 170 receives the multicast call request and generates an announce message for announcing the multicast call or session, 505. The application server 170 forwards the announce message to the RAN 120 for transmission to a plurality of ATs, 505. In FIG. 5, assume that AT 2 belongs to the multicast group of the announced multicast call. Accordingly, in 505, the RAN 120 transmits the announce message at least within AT 2's sector in the wireless communications system 100.

Next, assume that AT 2 receives and decodes the announce message, and determines to accept or join the announced multicast call. In 510, instead of simply generating a call acceptance message (e.g., an announce ACK accept message) and a call registration message (e.g., a BCMCSFlowRegistration message) that requests registration to each of a plurality of flows associated with the announced multicast call, AT 2 selects less than all flows (e.g., a single flow of a given flow-type) associated with the announced multicast call, 510. AT 2 then sends the call acceptance message to the application server 170 via the RAN 120 on a reverse link channel (e.g., the R-ACH, the R-TCH, etc.), and transmits the call registration message requesting registration only to the selected flow(s) to the RAN 120 on the reverse link channel, 515.

In an example, the selected call flow(s) from 510 can be representative of the multicast call such that only the selected call flow(s) need be designated in the call registration message in order to register for each flow associated with the multicast call. For example, AT 2 (e.g., and potentially other ATs joining the multicast session) may select the media flow only, in an example, and may send the call registration message with reference only to the media flow of the multicast session. In a further example, the selected call flow(s) can be selected based on an associated flow-type (e.g., media, in-call signaling, etc.) such that the same flow-type is used for call registration messages. In this manner, the RAN 120 can interpret any multicast call registration for a flow of that flow-type as being a request for all flows associated with the multicast call. Accordingly, as will be described in greater detail below, the RAN 120 interprets the call registration message referencing less than all flows in 515 as being a request to register to all flows associated of that particular multicast session. Furthermore, as will be appreciated by one of ordinary skill in the art, a call registration message requesting registration to fewer flows (e.g., less than all flows, such as a single flow of a default flow-type) consumes less bandwidth on a reverse link channel (e.g., the R-ACH, the R-TCH, etc.) carrying the call registration message. Thus, using one or more 'representative' call flow identifiers (e.g., BCMCSFlowIDs) in the call registration message (e.g., BCMCSFlowRegistration message) to designate at least one other flow not specifically referenced in the call registration message can reduce the load on the reverse link channel.

After receiving a first call acceptance message from a first responder to the announce message, the application server 170 sends a message to AT 1 (e.g., the PTT initiator) indicating that the multicast session can begin. Accordingly, AT 1 plays a tone to indicate that the user of AT 1 can begin speaking to the multicast group, and AT 1 begins forwards voice data, 520 (e.g., or other types of data, as in a PTX call) to the application server 170, which forwards the voice data to the RAN 120 for transmission at least within AT 2's sector.

After receiving the call registration message in 515, the RAN 120 interprets the call registration message that designates the selected call flow(s) as a request for each flow associated with the announced multicast call or session, 525. For example, in a PTT call, if two flows (e.g., a media flow and a signaling flow) each having their own flow identifier are associated with the PTT call, the call registration message may request registration to the media flow. The RAN 120 will interpret this request, however, as a request to register for both the media and signaling flows in 525. In another example, in a multi-media PTT call including three flows (e.g., a voice media flow, a video media flow, and an in-call signaling flow) each having their own flow identifier and each associated with the PTT call, the call registration message may request registration to any one of the three flows, or alternatively to two of the three flows. In either case, the RAN 120 interprets the call registration message as a request to register to each of the three flows. This example has been given to show that selecting less than all flows does not necessarily imply that only one flow is selected, although this could certainly be the case.

At some point after receiving the call registration message from AT 2, the RAN 120 transmits an initial scheduling message, 530, (e.g., a broadcast overhead message (BOM)) on a downlink CCH within AT 2's sector that lists or advertises the selected flow(s) to which AT 2 requested registration in the call registration message of 515. The RAN 120 omits reference, in the scheduling message, to the flows associated with the multicast session that were not indicated, or selected, by AT 2. As will be appreciated by one of ordinary skill in the art, a scheduling message, such as a BOM, that advertises fewer flows (e.g., less than all flows, such as a single flow of a default flow-type) consumes less bandwidth on the downlink CCH than a conventional scheduling message that would advertise all flows for the multicast session. Thus, using one or more 'representative' call flow identifiers (e.g., BCMCS-FlowIDs) in the scheduling message (e.g., BOM) to designate at least one other flow not specifically referenced in the scheduling message can reduce the load on the downlink CCH. The downlink CCH load reduction can further permit more multicast calls or sessions to be advertised on the downlink CCH, which can increase a multicast call capacity in a given sector, as will be discussed below in more detail with reference to FIGS. 7 and 8.

Next, assume that AT 2 receives and successfully decodes the scheduling message (e.g., BOM) advertising only the selected flow(s) from 530. In 535, AT 2 interprets the scheduling message, or BOM, advertising the selected flow(s) from among the flows associated with the multicast call as being carried on the downlink BCH as an indication that all flows for the multicast call are, in fact, being carried on the downlink BCH at the indicated BCH resource for the selected flow(s) in the scheduling message. For example, if the scheduling message is a BOM that advertises a BCMCSFlowID for a media flow of a PTT session at a given IM pair on the downlink BCH, AT 2 interprets this message in 535 as indicating that one or more other flows associated with the PTT session (e.g., a signaling flow and/or in-call signaling flows) are also carried in AT 2's sector on the given IM pair, in an example.

The recognition or interpretation by AT 2 that the one or more 'missing' or omitted flows from the scheduling message are, in fact, being carried on the downlink BCH resource indicated in the scheduling message for one or more representative flows of the multicast call, means that AT 2 need not send additional call registration messages on the reverse link channel (e.g., the R-ACH, the R-TCH, etc.) requesting that the RAN 120 carry the one or more 'missing' flows (i.e., because AT 2 already knows the 'missing' flows are actually present on the downlink BCH, and further knows how to tune to monitor the 'missing' flows). For example, if the scheduling message is a BOM that omits reference to a signaling flow of a given PTT session, AT 2 need not send a BCMCSFlow-Registration message identifying the signaling flow because AT 2 makes the assumption that the signaling flow is being carried by the RAN 120 on the downlink BCH resource, or IM pair, associated with an advertised media flow for the given PTT session.

Thus, in 540, AT 2 tunes to the downlink BCH in the manner indicated by the scheduling message for the selected flow(s), 540. In other words, AT 2 tunes to the indicated downlink BCH resource (e.g., IM pair) for the selected flow(s), 540. However, because each flow for the multicast session is carried on the same downlink BCH resource, it will be appreciated that by tuning to this downlink BCH resource, AT 2 is actually monitoring each flow for the multicast session in 540 (e.g., not merely the advertised or selected flow(s)). Next, the RAN 120 begins transmitting multicast messages forwarded from the application server 170 (e.g., the voice packets uploaded from AT 1) at least in AT 2's sector in the manner indicated by the scheduling message (e.g., on the BOM-indicated IM pair), 545. In 545, data associated with each flow of the multicast session is transmitted on the same downlink BCH resource indicated by the scheduling message in 530 for the selected flow(s), although it is understood that not all flows need be active at the same time (i.e., on the IM pair of the same BCH cycle). Because AT 2 has already tuned to the downlink BCH as indicated by the scheduling message, or BOM, for the given multicast session, AT 2 monitors and decodes the multicast packets on the downlink BCH for each flow of the multicast session, 550.

Accordingly, it will be appreciated the less than all flows can be used by AT 2 on the reverse link direction (e.g., in the call registration message sent on the reverse link channel in 515) and/or by the RAN 120 on the downlink direction (e.g., in the scheduling message or BOM sent on the downlink CCH in 530) to indicate a registration or advertisement for all flows of a given multicast session, so long as each of the flows is scheduled for transmission on the same downlink BCH. In this manner, the load on the reverse link channel and/or CCH can be reduced because redundant advertisements of or references to flows associated with the same multicast session need not be included in reverse link or forward link messaging, respectively.

Further, while the call registration message sent in 515 of FIG. 5 and the scheduling message sent in 530 of FIG. 5 are both configured to omit one or more flows associated with a multicast session while the omitted flow(s) are still carried on the downlink BCH, it will be appreciated that these messages need not be used in combination. For example, the call registration message sent in 515 can designate only the selected flow(s), which reduces the load on the reverse link channel as discussed above. The RAN 120 could then interpret the call registration message as being for each flow of the multicast session as in 525, but could transmit the scheduling message, or BOM, advertising each flow of the multicast session, instead of merely the selected flow(s). For example, if not all multicast group members are expected to be capable of interpreting a representative flow as implying each multicast flow is carried on the downlink BCH (e.g., as in 535 at AT 2), the RAN 120 may advertise each multicast flow to reduce the number of call registration messages for the omitted flow(s) from the non-compliant multicast group members.

Further, as will be described below with respect to FIG. 6, even if an AT, such as AT 2, sends a call registration message that lists each multicast flow associated with a multicast session, the RAN 120 can still configure the scheduling message, or BOM, to list less than all flows of the multicast session. In this case, the selection as to which flow(s) are advertised would be made at the RAN 120, because the call registration message received from AT 2 on the reverse link channel makes reference to each of the multicast flows.

Figure 6:
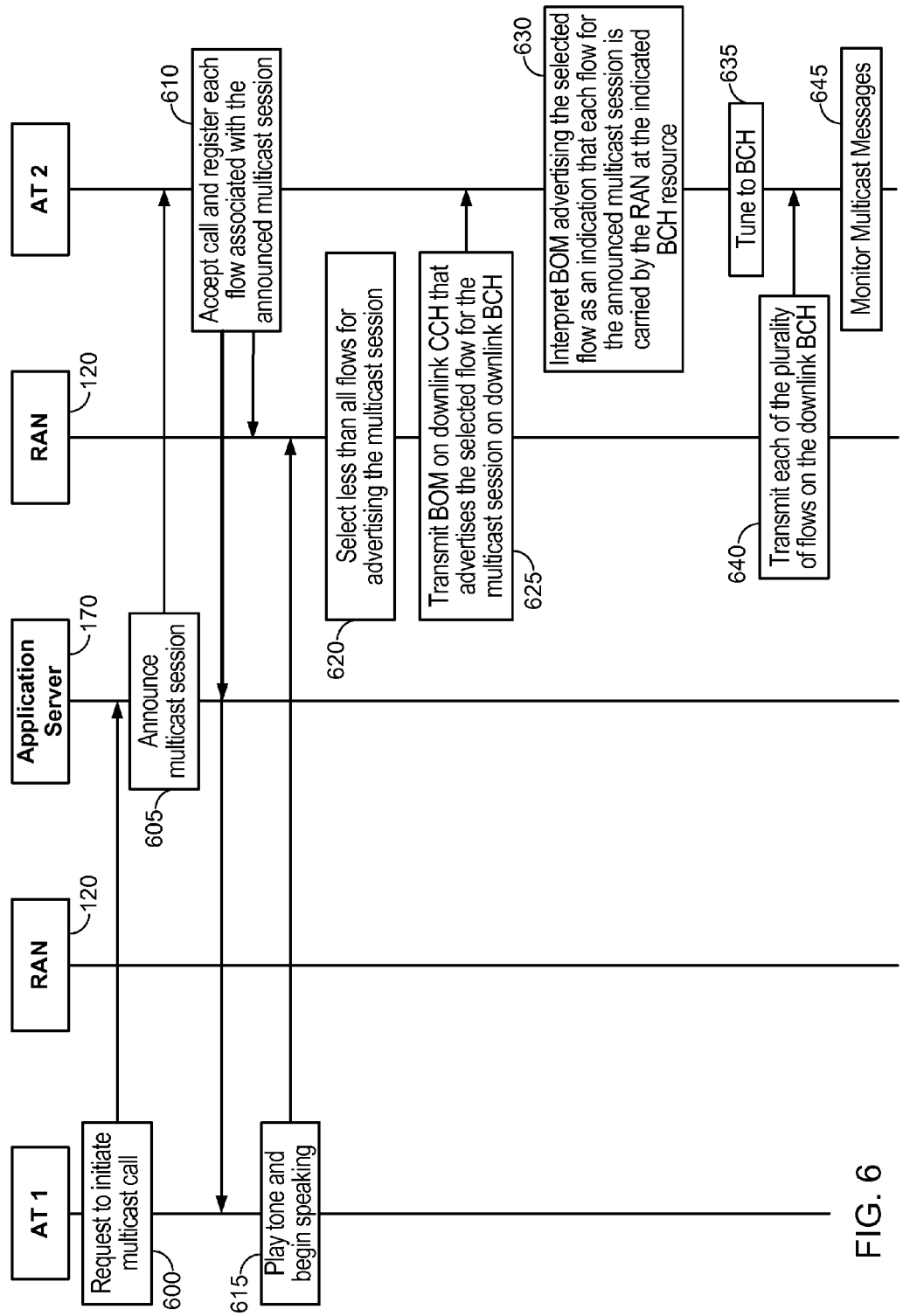
FIG. 6 illustrates a multicast call set-up process according to another embodiment of the invention.

Accordingly, FIG. 6 illustrates a multicast call set-up process according to another embodiment of the invention. Referring to FIG. 6, a given AT ("AT 1") sends a message requesting to initiate a multicast call or session, 600. The RAN 120 receives the multicast call request and forwards the multicast call request to the application server 170. The application server 170 receives the multicast call request and generates an announce message for announcing the multicast call or session, 605. The application server 170 forwards the announce message to the RAN 120 for transmission to a plurality of ATs, 605. 600 and 605 of FIG. 6 generally correspond to 500 and 505 of FIG. 5, and as such will not be described further for the sake of brevity.

Next, assume that AT 2 receives and decodes the announce message, and determines to accept or join the announced multicast call. AT 2 generates a call acceptance message (e.g., an announce ACK accept message) and a call registration message (e.g., a BCMCSFlowRegistration message) that requests registration to each of a plurality of flows associated with the announced multicast call, as in 410 of FIG. 4. AT 2 sends the call acceptance message to the application server 170 via the RAN 120 on the reverse link channel, and transmits the call registration message requesting registration to each multicast flow of the multicast session to the RAN 120 on the reverse link channel, 610. Accordingly, the call registration message of 610 is sent in a conventional manner such that reference is made to each multicast flow that AT 2 wishes to monitor, even if multiple flows are associated with different aspects (e.g., voice media, video media, in-call signaling, etc.) or flow-types of the same multicast session.

After receiving a first call acceptance message from a first responder to the announce message, the application server 170 sends a message to AT 1 (e.g., the PTT initiator) indicating that the multicast session can begin. Accordingly, AT 1 plays a tone to indicate that the user of AT 1 can begin speaking to the multicast group, and AT 1 begins forwards voice data, 615 (e.g., or other types of data, as in a PTX call) to the application server 170, which forwards the voice data to the RAN 120 for transmission at least within AT 2's sector.

After receiving the call registration message in 610, instead of simply generating a scheduling message that advertises each of a plurality of flows associated with the announced multicast call, the RAN 120 selects less than all flows (e.g., a single flow of a given flow-type) associated with the announced multicast call, 620. In an example, the selection of 620 of FIG. 6 performed at the RAN 120 can be performed in the same manner as the selection of 510 of FIG. 5 performed at the AT 2, such that one or more 'representative' call flow IDs are selected to represent each of the multicast call flows of a multicast session (e.g., such that each call flow need not be identified or advertised in the downlink scheduling message transmitted on the downlink CCH). In this case, FIG. 6 shows that a reduced scheduling message that identifies less than all flows of a multicast session can be deployed even where a call registration message makes reference to all flows of the multicast session. Accordingly, as evidenced by FIG. 6, while useable together, the reduced call registration message (e.g., BCMCSFlowRegistration message) of 515 of FIG. 5 need not necessarily be used in conjunction with the reduced scheduling message (e.g., BOM) of 530 of FIG. 5.

After making the selection in 620, the RAN 120 transmits a scheduling message (e.g., BOM) on the downlink CCH that advertises the selected flow(s) of the multicast session, 620. AT 2 interprets the advertisement of the selected or 'representative' flow(s) as indicative that each flow is carried at the indicated BCH resource (e.g., IM pair) in 630, as in 535 of FIG. 5 (e.g., such that BCMCSFlowRegistration messages requesting the 'missing' flows in AT 2's sector need not be transmitted because AT 2 already knows these flows are being carried at the given IM pair). Next, 635, 640 and 645 of FIG. 6 correspond to 540, 545 and 550 of FIG. 5, and as such will not be described further for the sake of brevity.

As discussed above, reducing the number of flows of a given multicast session advertised in a downlink scheduling message, such as a BOM, preserves resources on the downlink CCH. This in turn allows more multicast sessions to be advertised based on their representative flow(s).

Figure 7:
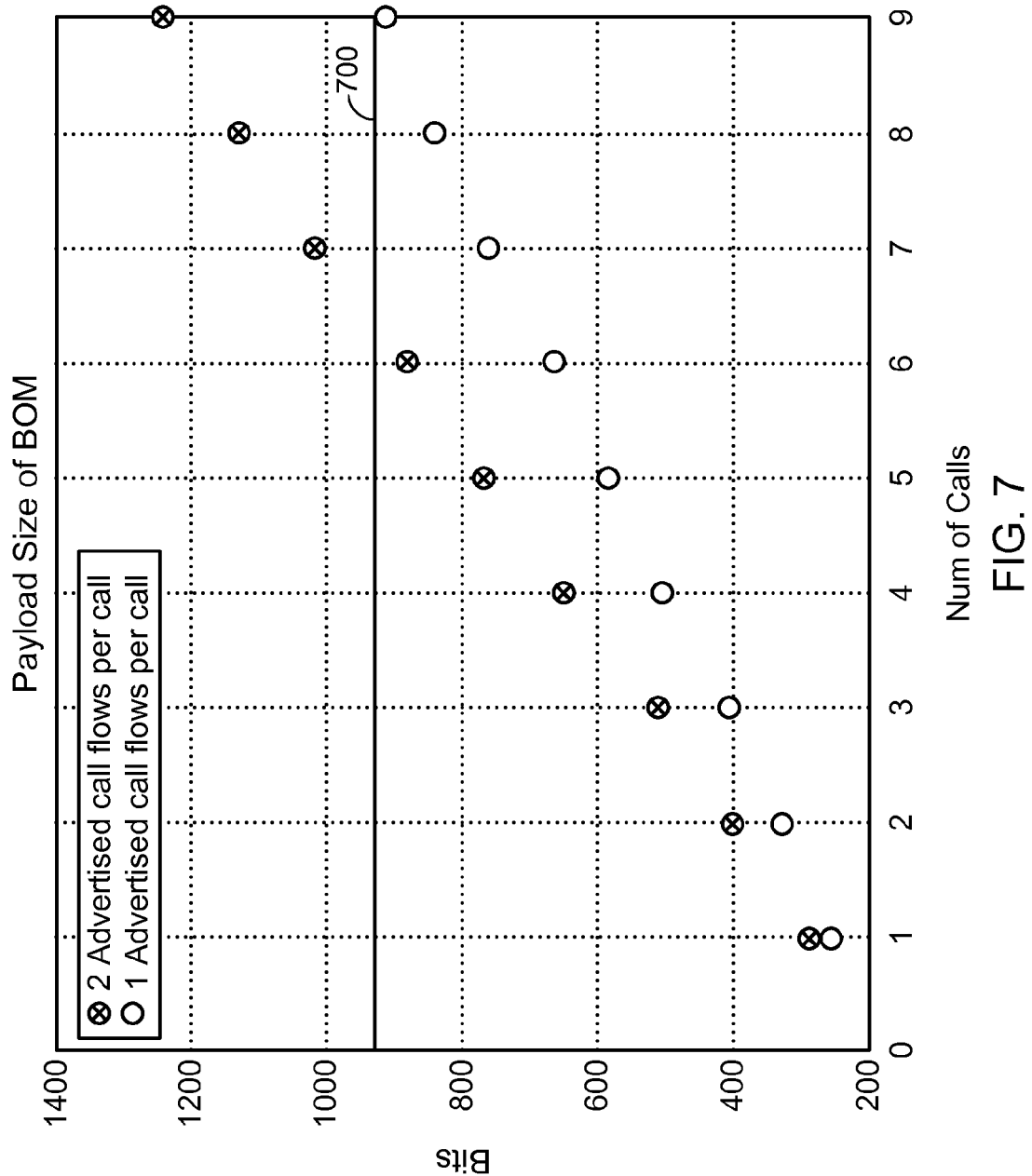
FIG. 7 illustrates a graph of the number of bits required for a broadcast overhead message (BOM) on the y-axis versus a number of multicast call sessions advertised by the BOM on the x-axis according to an embodiment of the present invention.

For example, assume that the downlink CCH sends data packets having a size of 1024-bits at a rate of 307.2 kilobits per second (kbps), that a media access control (MAC) packet on the downlink CCH has a net payload of 928 bits, that the scheduling message is a BOM, each multicast session has two (2) call flows, and that the multicasting protocol is an EV-DO multicasting protocol (e.g., a BCMCS protocol). FIG. 7 illustrates a graph of the number of bits required for a BOM on the y-axis versus a number of multicast call sessions advertised by the BOM on the x-axis according to an embodiment of the present invention. In particular, a comparison is shown where, for each of 1 through 9 different multicast calls, the BOM bits required for advertising each multicast call flow per multicast call session, as in the conventional art, are shown in contrast to where a single representative multicast call flow that is advertised per multicast call session. While FIG. 7 illustrates the example of advertising a single multicast call flow per multicast call in the BOM, it is understood that other embodiments can be directed to any BOM (or other scheduling message) where less than all flows of the multicast call are advertised. In FIG. 7, line 700 denotes the downlink CCH MAC packet bit-limit of 928 bits for this example. Thus, in FIG. 7, BOMs advertising seven or more (7+) multicast calls cannot be contained within a single downlink CCH MAC packet under these assumptions where two flows per call are advertised, whereas up to nine (9) multicast calls can be advertised using a single representative multicast call flow per multicast call in accordance with an embodiment of the present invention.

Figure 8:
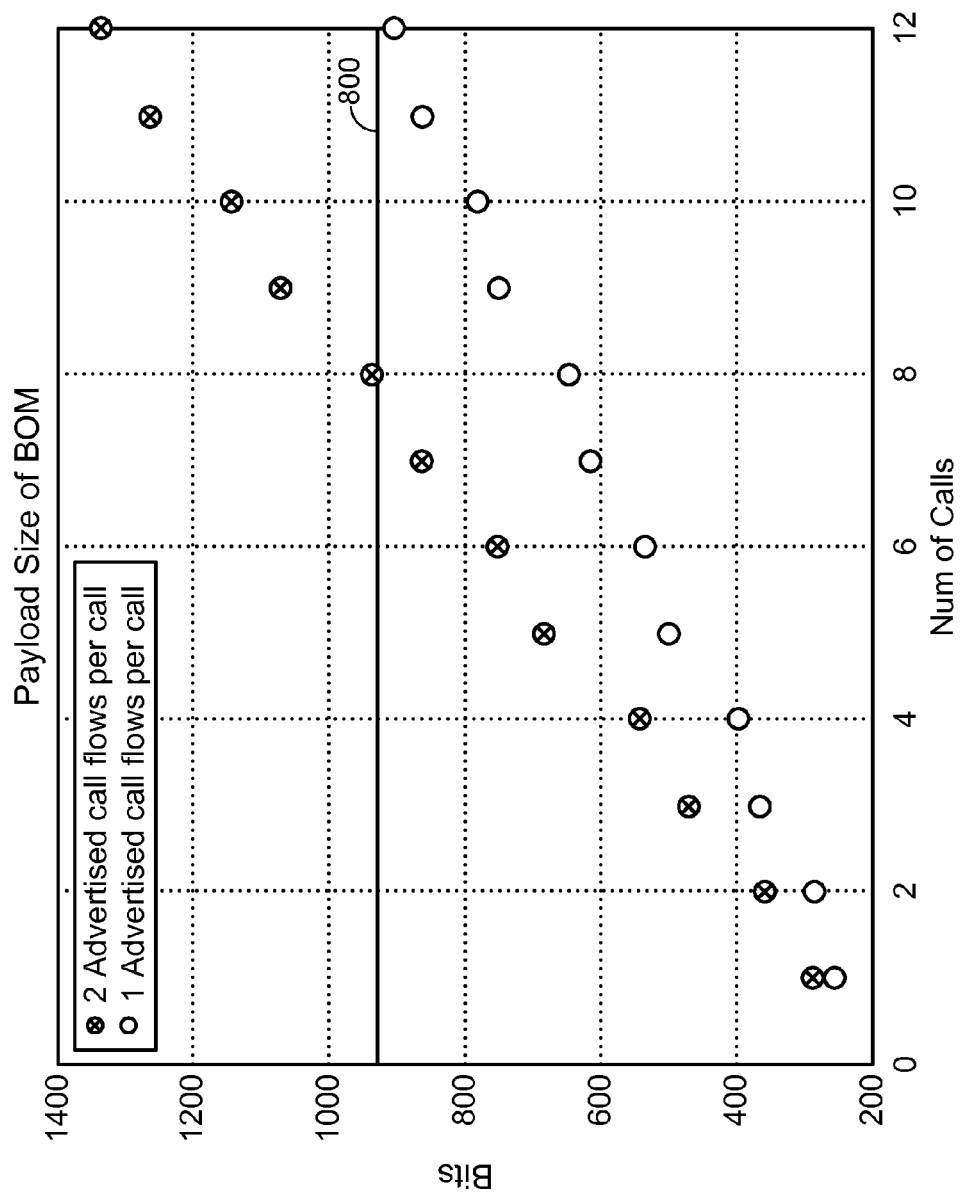
FIG. 8 illustrates a graph of the number of bits required for a BOM on the y-axis versus a number of multicast call sessions advertised by the BOM on the x-axis according to another embodiment of the present invention.

In another example, assume that the downlink CCH sends data packets having a size of 2048-bits at a rate of 409.6 kilobits per second (kbps), that a media access control (MAC) packet on the downlink CCH has a net payload of 928 bits, that the scheduling message is a BOM, each multicast session has two (2) call flows and that the multicasting protocol is an EV-DO multicasting protocol (e.g., a BCMCS protocol). FIG. 8 illustrates a graph of the number of bits required for a BOM on the y-axis versus a number of multicast call sessions advertised by the BOM on the x-axis according to another embodiment of the present invention. In particular, a comparison is shown where, for each of 1 through 12 different multicast calls, the BOM bits required for advertising each multicast call flow per multicast call session, as in the conventional art, are shown in contrast to where a single representative multicast call flow that is advertised per multicast call session. While FIG. 8 illustrates the example of advertising a single multicast call flow per multicast call in the BOM, it is understood that other embodiments can be directed to any BOM (or other scheduling message) where less than all flows of the multicast call are advertised. In FIG. 8, line 800 denotes the downlink CCH MAC packet bit-limit of 928 bits for this example. Thus, in FIG. 8, BOMs advertising eight or more (8+) multicast calls cannot be contained within a single downlink CCH MAC packet under these assumptions where two flows per call are advertised, whereas up to twelve (12) multicast calls can be advertised using a single representative multicast call flow per multicast call in accordance with an embodiment of the present invention.

Also, while above-described embodiments of the invention have referenced EV-DO multicast protocols such as BCMCS, it will be appreciated that other embodiments of the invention be directed to any multicast protocol (e.g., MBMS in UMTS, etc.) where reverse link or downlink messaging that references multicast flows of a multicast session is reduced by using less than all flows to represent each flow of the group, such that not all flows for a multicast session need be referenced in a call registration message (e.g., BCMCSFlowRegistration message in BCMCS), and/or such that not all flows for the multicast session need be referenced in a downlink scheduling message (e.g., BOM in BCMCS) indicating which flows the RAN 120 is carrying.

Further, while the downlink scheduling message or BOM is disclosed as advertising 'only' representative multicast call flow(s) or selected call flow(s) in certain embodiments of the invention, this is intended to be relative to the one or more omitted call flows from that particular multicast call session only. In other words, the term "only" in this circumstance is not intended to indicate that no other multicast call sessions are advertised, but rather merely that, for a particular multicast call session within the scheduling message or BOM, only the representative call flows are advertised. Thus, while the scheduling message or BOM only transmits the selected or representative call flow(s) for one multicast call session, the same BOM can also advertise call flows associated with other multicast call sessions. This should be appreciated in view of the description given with respect to FIGS. 7 and 8, above (e.g., where multiple calls are advertised in a BOM on a single downlink CCH MAC packet).

Further, while each of FIGS. 5 and 6 are directed to BOMs sent during call set-up, and call registration messages sent by ATs in response to call announce messages, it is understood that BOMs are transmitted at a given BOM interval throughout the multicast session, and that each of the BOMs can include a reduced number of advertised flows, in an example. Likewise, the call registration message transmitted by AT 2 need not be in response to a call announce message. For example, AT 2 may wake up after the multicast call has been announced, and can send the call registration message that point. Alternatively, AT 2's call registration message can be prompted by the RAN 120 itself (e.g., if the RAN 120 sets an RFDB field in the BOM to "1" to prompt a BCMCSFlow-Registration message), or upon AT 2's entry into a new sector that is not yet supporting the multicast session (e.g., after waiting a given amount of time to receive BOM, and then determining that the multicast session is not yet carried in the sector). Any of these call registration messages can include references to a reduced number of multicast call flows in other embodiments of the invention.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of registering to a given multicast session in a wireless communications system, comprising:
    selecting less than all of a plurality of flows associated with the given multicast session; and
    sending a call registration message including reference to the selected less than all flows to an access network to request registration to each of the plurality of flows associated with the given multicast session.

2. The method of claim 1, wherein the selecting step selects a single flow from the plurality of flows associated with the given multicast session.

3. The method of claim 1, wherein the selecting step selects more than one flow from the plurality of flows associated with the given multicast session.

4. The method of claim 1, wherein the sending step sends the call registration message on a reverse link access channel or a reverse link traffic channel.

5. The method of claim 1, further comprising:
    receiving an announce message from the access network that announces the given multicast session,
    wherein the selecting and sending steps are performed in response to the announce message.

6. The method of claim 1, wherein the call registration message is a BCMCSFlowRegistration message that references the selected less than all flows based on their associated BCMCSFlowIDs.

7. A method of conveying scheduling information for a given multicast session in a wireless communications system, comprising:
    receiving, from at least one access terminal of a group of access terminals, a call registration message that includes reference to at least one of the plurality of flows associated with the given multicast session, the call registration message requesting registration to each of the plurality of flows associated with the given multicast session; and transmitting, in response to the call registration message, a scheduling message to the group of access terminals that advertises less than all of a plurality of flows associated with the given multicast session, the scheduling message configured to indicate, to the group of access terminals, that each of the plurality of flows is being carried on a downlink channel and how to tune to the downlink channel for monitoring each of the plurality of flows.

8. The method of claim 7, wherein the call registration message includes reference to each of the plurality of flows associated with the given multicast session.

9. The method of claim 8, further comprising:
selecting, at an access network, the less than all flows advertised in the scheduling message.

10. The method of claim 7, wherein the call registration message includes reference to fewer than all of the plurality of flows associated with the given multicast session.

11. The method of claim 10, wherein the fewer than all flows referenced by the call registration message are the same as the less than all flows advertised by the scheduling message.

12. The method of claim 11, wherein the less than all flows advertised in the scheduling message and the fewer than all flows referenced by the call registration message are selected at the at least one of the group of access terminals from which the call registration message is received.

13. The method of claim 7, wherein the less than all flows advertised in the scheduling message includes a single flow from the plurality of flows associated with the given multicast session.

14. The method of claim 7, wherein the less than all flows advertised in the scheduling message includes more than one flow from the plurality of flows associated with the given multicast session.

15. The method of claim 7, wherein the scheduling message is a broadcast overhead message that advertises the less than all flows based on their associated BCMCSFlowIDs.

16. A method of interpreting a call registration for a given multicast session in a wireless communications system, comprising:
receiving, from at least one of a group of access terminals, a call registration message that includes reference to less than all of a plurality of flows associated with the given multicast session;
interpreting the call registration message that references the less than all of the plurality of flows as requesting registration to each of the plurality of flows associated with the given multicast session; and
registering each of the plurality of flows associated with the given multicast session based on the interpretation.

17. The method of claim 16, further comprising:
transmitting a scheduling message to the group of access terminals that advertises the less than all flows referenced by the call registration message, the scheduling message configured to indicate, to the group of access terminals, that each of the plurality of flows is being carried on a downlink channel and how to tune to the downlink channel for monitoring each of the plurality of flows.

18. The method of claim 16, wherein the less than all flows referenced by the call registration message includes a single flow from the plurality of flows associated with the given multicast session.

19. The method of claim 16, wherein the less than all flows referenced by the call registration message includes more than one flow from the plurality of flows associated with the given multicast session.

20. The method of claim 16, wherein the call registration message is a BCMCSFlowRegistration message that references the selected less than all flows based on their associated BCMCSFlowIDs.

21. A method of interpreting a scheduling message for a given multicast session in a wireless communications system:
receiving the scheduling message at a given access terminal that advertises less than all of a plurality of flows associated with the given multicast session, the scheduling message configured to indicate how to tune to a downlink channel for monitoring the advertised flows; and
interpreting the scheduling message that advertises the less than all of the plurality of flows as indicating that each of the plurality of flows associated with the given multicast session is being carried on the downlink channel,
wherein the less than all flows advertised in the scheduling message are selected from the plurality of flows at the given access terminal or at an access network serving the given access terminal, and a call registration message sent previously by the given access terminal references the selected less than all flows.

22. The method of claim 21, wherein the downlink channel is a downlink broadcast channel.

23. The method of claim 21, further comprising:
refraining from sending another call registration message that requests an access network to carry one or more flows from the plurality of flows that are omitted from the scheduling message based on the interpreting step.

24. The method of claim 21, wherein the less than all flows advertised by the scheduling message includes a single flow from the plurality of flows associated with the given multicast session.

25. The method of claim 21, wherein the less than all advertised by the scheduling message includes more than one flow from the plurality of flows associated with the given multicast session.

26. The method of claim 21, wherein the scheduling message is a broadcast overhead message that advertises the less than all flows based on their associated BCMCSFlowIDs.

27. An access terminal in a wireless communications system, comprising:
means for selecting less than all of a plurality of flows associated with a given multicast session; and
means for sending a call registration message including reference to the selected less than all flows to an access network to request registration to each of the plurality of flows associated with the given multicast session.

28. The access terminal of claim 27, further comprising:
means for receiving an announce message from the access network that announces the given multicast session,
wherein the means for selecting and means for sending perform the selecting and sending, respectively, in response to the announce message.

29. An access network supporting a given multicast session in a wireless communications system, comprising:
means for receiving, from at least one access terminal of a group of access terminals, a call registration message that includes reference to at least one of the plurality of flows associated with the given multicast session, the call registration message requesting registration to each of the plurality of flows associated with the given multicast session; and means for transmitting, in response to the call registration message, a scheduling message to the group of access terminals that advertises less than all of a plurality of flows associated with the given multicast session, the scheduling message configured to indicate, to the group of access terminals, that each of the plurality of flows is being carried on a downlink channel and how to tune to the downlink channel for monitoring each of the plurality of flows.

30. An access network supporting a given multicast session in a wireless communications system, comprising:
means for receiving, from at least one of a group of access terminals, a call registration message that includes reference to less than all of a plurality of flows associated with the given multicast session;
means for interpreting the call registration message that references the less than all of the plurality of flows as requesting registration to each of the plurality of flows associated with the given multicast session; and
means for registering each of the plurality of flows associated with the given multicast session based on the interpretation.

31. The access network of claim 30, further comprising:
means for transmitting a scheduling message to the group of access terminals that advertises the less than all flows referenced by the call registration message, the scheduling message configured to indicate, to the group of access terminals, that each of the plurality of flows is being carried on a downlink channel and how to tune to the downlink channel for monitoring each of the plurality of flows.

32. An access terminal in a wireless communications system, comprising:
means for receiving a scheduling message that advertises less than all of a plurality of flows associated with a given multicast session, the scheduling message configured to indicate how to tune to a downlink channel for monitoring the advertised flows; and
means for interpreting the scheduling message that advertises the less than all of the plurality of flows as indicating that each of the plurality of flows associated with the given multicast session is being carried on the downlink channel,
wherein the less than all flows advertised in the scheduling message are selected from the plurality of flows at the given access terminal or at an access network serving the given access terminal, and a call registration message sent previously by the given access terminal references the selected less than all flows.

33. The access terminal of claim 32, further comprising:
means for refraining from sending another call registration message that requests an access network to carry one or more flows from the plurality of flows that are omitted from the scheduling message based on the interpretation of the means for interpreting.

34. An access terminal in a wireless communications system, comprising:
logic configured to select less than all of a plurality of flows associated with a given multicast session; and
logic configured to send a call registration message including reference to the selected less than all flows to an access network to request registration to each of the plurality of flows associated with the given multicast session.

35. The access terminal of claim 34, further comprising:
logic configured to receive an announce message from the access network that announces the given multicast session,
wherein the logic configured to select and logic configured to send perform the selecting and sending, respectively, in response to the announce message.

36. An access network supporting a given multicast session in a wireless communications system, comprising:
logic configured to receive, from at least one access terminal of a group of access terminals, a call registration message that includes reference to at least one of the plurality of flows associated with the given multicast session, the call registration message requesting registration to each of the plurality of flows associated with the given multicast session; and
logic configured to transmit, in response to the call registration message, a scheduling message to the group of access terminals that advertises less than all of a plurality of flows associated with the given multicast session, the scheduling message configured to indicate, to the group of access terminals, that each of the plurality of flows is being carried on a downlink channel and how to tune to the downlink channel for monitoring each of the plurality of flows.

37. An access network supporting a given multicast session in a wireless communications system, comprising:
logic configured to receive, from at least one of a group of access terminals, a call registration message that includes reference to less than all of a plurality of flows associated with the given multicast session;
logic configured to interpret the call registration message that references the less than all of the plurality of flows as requesting registration to each of the plurality of flows associated with the given multicast session; and
logic configured to register each of the plurality of flows associated with the given multicast session based on the interpretation.

38. The access network of claim 37, further comprising:
logic configured to transmit a scheduling message to the group of access terminals that advertises the less than all flows referenced by the call registration message, the scheduling message configured to indicate, to the group of access terminals, that each of the plurality of flows is being carried on a downlink channel and how to tune to the downlink channel for monitoring each of the plurality of flows.

39. An access terminal in a wireless communications system, comprising:
logic configured to receive a scheduling message that advertises less than all of a plurality of flows associated with a given multicast session, the scheduling message configured to indicate how to tune to a downlink channel for monitoring the advertised flows; and
logic configured to interpret the scheduling message that advertises the less than all of the plurality of flows as indicating that each of the plurality of flows associated with the given multicast session is being carried on the downlink channel,
wherein the less than all flows advertised in the scheduling message are selected from the plurality of flows at the given access terminal or at an access network serving the given access terminal, and a call registration message sent previously by the given access terminal references the selected less than all flows.

40. The access terminal of claim 39, further comprising:
   logic configured to refrain from sending another call registration message that requests an access network to carry one or more flows from the plurality of flows that are omitted from the scheduling message based on the interpretation of the logic configured to interpret.

41. A non-transitory computer-readable medium comprising instructions, which, when executed by an access terminal in a wireless communications system, cause the access terminal to perform operations, the instructions comprising:
   program code to select less than all of a plurality of flows associated with a given multicast session; and
   program code to send a call registration message including reference to the selected less than all flows to an access network to request registration to each of the plurality of flows associated with the given multicast session.

42. The non-transitory computer-readable medium of claim 41, further comprising:
   program code to receive an announce message from the access network that announces the given multicast session,
   wherein the program code to select and program code to send perform the selecting and sending, respectively, in response to the announce message.

43. A non-transitory computer-readable medium comprising instructions, which, when executed by an access network supporting a given multicast session in a wireless communications system, cause the access network to perform operations, the instructions comprising:
   program code to receive, from at least one access terminal of a group of access terminals, a call registration message that includes reference to at least one of the plurality of flows associated with the given multicast session, the call registration message requesting registration to each of the plurality of flows associated with the given multicast session; and
   program code to transmit, in response to the call registration message, a scheduling message to the group of access terminals that advertises less than all of a plurality of flows associated with the given multicast session, the scheduling message configured to indicate, to the group of access terminals, that each of the plurality of flows is being carried on a downlink channel and how to tune to the downlink channel for monitoring each of the plurality of flows.

44. A non-transitory computer-readable medium comprising instructions, which, when executed by an access network supporting a given multicast session in a wireless communications system, cause the access network to perform operations, the instructions comprising:
   program code to receive, from at least one of a group of access terminals, a call registration message that includes reference to less than all of a plurality of flows associated with the given multicast session;
   program code to interpret the call registration message that references the less than all of the plurality of flows as requesting registration to each of the plurality of flows associated with the given multicast session; and
   program code to register each of the plurality of flows associated with the given multicast session based on the interpretation.

45. The non-transitory computer-readable medium of claim 44, further comprising:
   program code to transmit a scheduling message to the group of access terminals that advertises the less than all flows referenced by the call registration message, the scheduling message configured to indicate, to the group of access terminals, that each of the plurality of flows is being carried on a downlink channel and how to tune to the downlink channel for monitoring each of the plurality of flows.

46. A non-transitory computer-readable medium comprising instructions, which, when executed by an access terminal in a wireless communications system, cause the access terminal to perform operations, the instructions comprising:
   program code to receive a scheduling message that advertises less than all of a plurality of flows associated with a given multicast session, the scheduling message configured to indicate how to tune to a downlink channel for monitoring the advertised flows;
   program code to interpret the scheduling message that advertises the less than all of the plurality of flows as indicating that each of the plurality of flows associated with the given multicast session is being carried on the downlink channel,
   wherein the less than all flows advertised in the scheduling message are selected from the plurality of flows at the given access terminal or at an access network serving the given access terminal, and a call registration message sent previously by the given access terminal references the selected less than all flows.

47. The non-transitory computer-readable medium of claim 46, further comprising:
   program code to refrain from sending another call registration message that requests an access network to carry one or more flows from the plurality of flows that are omitted from the scheduling message based on the interpretation of the program code to interpret.

* * * * *